United States Patent
Wei et al.

(10) Patent No.: US 6,875,722 B2
(45) Date of Patent: Apr. 5, 2005

(54) SILICON-CONTAINING ALUMINA SUPPORT, A PROCESS FOR PREPARING THE SUPPORT AND A CATALYST CONTAINING THE SUPPORT

(75) Inventors: Dengling Wei, Liaoning (CN); Shaozhong Peng, Liaoning (CN)

(73) Assignees: China Petroleum & Chemical Corporation, Bejing (CN); Fushun Research Institute of Petroleum and Petroch, Fushun (CN)

( * ) Notice: Subject to any disclaimer, the term of this patent is extended or adjusted under 35 U.S.C. 154(b) by 0 days.

(21) Appl. No.: 10/682,221

(22) Filed: Oct. 9, 2003

(65) Prior Publication Data

US 2004/0082467 A1 Apr. 29, 2004

(30) Foreign Application Priority Data

Oct. 10, 2002 (CN) ........................................ 02133118 A
Oct. 10, 2002 (CN) ........................................ 02133122 A
Oct. 10, 2002 (CN) ........................................ 02133125 A
Oct. 10, 2002 (CN) ........................................ 02133144 A

(51) Int. Cl.$^7$ ............................ B01J 23/40; B01J 27/14
(52) U.S. Cl. ........................ 502/208; 502/210; 502/211; 502/254; 502/255; 502/256; 502/257; 502/240; 502/263; 502/439

(58) Field of Search ................................. 502/208, 211, 502/210, 254, 255, 257, 256, 240, 263, 439

(56) References Cited

U.S. PATENT DOCUMENTS 4,758,544 A    7/1988   Plesko et al.
5,827,421 A  * 10/1998  Sherwood, Jr. ............. 208/112

* cited by examiner

Primary Examiner—Elizabeth D. Wood
(74) Attorney, Agent, or Firm—Cohen, Pontani, Lieberman & Pavane

(57) ABSTRACT

A silicon-containing alumina support, a process for preparing the support, and a catalyst containing the support are provided. The alumina support includes an additive silicon enriched on its surface, with the difference between the atomic ratio of silicon to aluminum on the surface of alumina support and that of the alumina support is at least 0.10. The process for preparing the silicon-containing alumina support comprises adding a nanometer silicon compound. The inventive alumina support can be used in manufacturing a catalyst for hydrotreating hydrocarbons with good physico-chemical properties and performance.

15 Claims, No Drawings

SILICON-CONTAINING ALUMINA SUPPORT, A PROCESS FOR PREPARING THE SUPPORT AND A CATALYST CONTAINING THE SUPPORT

BACKGROUND OF THE INVENTION

1. Field of the Invention

The present invention relates to a silicon-containing alumina support, a process for preparing it and a catalyst containing it, especially a catalyst for hydrotreating hydrocarbons.

2. Description of the Related Art

Alumina is a commonly used support for catalysts. Its surface properties, such as the specific surface area, the amount and strength of the surface acid, and porosity properties, such as the average pore size and the pore size distribution, have decisive influence on the performance of the catalysts containing it. In order to improve the properties of alumina supports, silicon, phosphorus, boron, titanium and zirconium are used to modify it. Of the modifying agents, silicon is the most commonly used. It has been found that silicon modifies the surface properties of alumina support. However, silicon introduced into alumina support in accordance with the prior art adversely affects the microstructure of the alumina support, e.g. renders the pore size distribution of alumina support diffuse, adversely affecting the surface properties.

Alumina support is commonly used in catalysts for hydrotreating hydrocarbons. In the catalysts for hydrotreating hydrocarbons, the active components are the oxides of a metal from Group VIB and a metal from Group VIII of the Periodic Table of Elements. To improve the performance of the catalysts, one approach is to modify the alumina support. It has been shown that silica introduced into the alumina support has significant effect on the catalyst containing the alumina support in terms of acidity, the dispersion of the metals and pore size distribution. Specifically, in accordance with the theory of minimum energy, the silica introduced into the alumina support first interacts with the strong active centers on the alumina surface and reduces the strength of the latter. As a result, the interaction between alumina support and the active metals become milder, thus resulting in the metals being dispersed better and displaying better activity. Therefore, one of the strategies to improve the catalysts for hydrotreating hydrocarbons is to modify the alumina support with silicon.

One of the major sources of silicon for introducing into catalyst for hydrotreating hydrocarbons is silicates or silicon sol. To introduce the silicon, an aluminum-containing compound is co-precipitated with sodium silicate (or water glass) to give a silicon-containing alumina; or alternatively, aluminum hydroxide or alumina is mixed with a silicon sol to give a silicon-containing alumina hydroxide. Typically, the content of silica in the catalyst is 1 to 10% by weight.

U.S. Pat. No. 4,758,544 discloses a process for preparing by co-precipitation a support, i.e. alumina-aluminum phosphate-silica, and loading the support with W—Ni—F to give a catalyst. Since the elements silicon and phosphorus are introduced into the support by co-precipitating, they are inevitably dispersed in the bulk of alumina support in large amount, thus reducing the availability and effect of them. In addition, the presence of both silicon and phosphorus in the alumina support affects the microstructure of the alumina support, leading to a diffuse pore size distribution, a small pore volume and specific surface area. Thus, the dispersion and effect of the additives (P and Si) suffer.

Chinese Patent No. 1048651C discloses a process for preparing an alumina support containing silicon and phosphorus by precipitation from aluminum sulfate and sodium meta-aluminate. Since the silicon source is sodium silicate, there exist defects similar to the above with this process.

U.S. Pat. No. 4,134,856 discloses a process for preparing alumina support containing silica by co-precipitation. There also exist defects similar to the above with this process. In particular, the alumina support prepared by the process has a diffuse pore size distribution, and a large specific surface area and pore volume, and is amorphous.

Chinese Patent No. 1030395C discloses a process for preparing a support or catalyst wherein silicon sol is introduced into aluminum hydroxide during the procedures for moulding alumina support or catalyst. However, silicon sol acts to expand the pores in the alumina support or catalyst in the subsequent drying or calcining procedures. Therefore, the obtained alumina support or catalyst has a diffuse pore size distribution, unfavourably affecting the performance of the catalyst.

Therefore, the problem common to the prior art processes for introducing silicon of the indicated source into alumina support is that the content of silicon in the bulk alumina support is relatively high, while that on the surface is relatively low, adversely affecting the effect of silicon modifying the surface properties of the support.

SUMMARY OF THE INVENTION

To address the problem of the prior art, the present invention provides a silicon-containing alumina support wherein the additive silicon is enriched on the surface of the alumina support, a process for preparing such an alumina support, and a catalyst for hydrotreating hydrocarbons prepared from such an alumina support.

Therefore, according to the first aspect of the invention, there is provided a silicon-containing alumina support, comprising γ-alumina as main component and silica as additive. Based on the weight of the support, the alumina support comprises 0.5 to 10.0% of silica; the additive silicon is enriched on the surface of the alumina support; and the difference between the atomic ratio of silicon to aluminum on the surface and the average atomic ratio of silicon to aluminum of the alumina support is at least 0.10, typically 0.10 to 0.25, and preferably 0.12 to 0.20.

According to the second aspect of the invention, there is provided a process for preparing a silicon-containing alumina support, comprising mixing and/or kneading aluminum hydroxide or alumina, while adding a nanometer silicon compound; adding a peptizing acid and mixing all the materials to form a plastic mass; moulding the mass, drying it and calcining it, so as to provide the inventive silicon-containing alumina support.

According to the third aspect of the invention, there is provided use of the inventive silicon-containing alumina support in the manufacture of the catalysts for hydrotreating, e.g. hydrocracking and hydrorefining hydrocarbons.

According to the fourth aspect of the invention, there is provided a catalyst for hydrotreating hydrocarbons, comprising, as support, the inventive silicon-containing alumina support, and, as active components, a metal from Group VIB and a metal from Group VIII of the Periodic Table of Elements.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

The silicon-containing alumina support according to the present invention comprises γ-alumina support as main component and silica as additive. Based on the total weight of the support, the content of silica in the alumina support is 0.5 to 10.0%, and preferably 1.0 to 7.0%; the additive silicon is enriched on the surface of the alumina support; and the difference between the atomic ratio of silicon to aluminum on the surface and the average atomic ratio of silicon to aluminum of the alumina support is at least 0.10, typically 0.10 to 0.25, and preferably 0.12 to 0.20. In the inventive silicon-containing alumina support, the atomic ratio of silicon to aluminum on the surface is at least 0.15, typically 0.15 to 0.30, and preferably 0.16 to 0.25.

The inventive silicon-containing alumina support has a pore volume of 0.55 to 0.68 ml/g, a specific surface area of 270–320 $m^2/g$, and an average pore size of 6.5 to 9.5 nm, with the volume of the pores of a size between 3 to 15 nm constituting at least 90%, and typically 90 to 95%, of the total volume of the pores of the alumina support.

The silicon-containing alumina support according to the present invention optionally comprises additive phosphorus, calculated as phosphorus pentoxide, in the amount of 0.3 to 3.0% by weight.

In addition, the silicon-containing alumina support according to the present invention optionally comprises additives titanium, boron, zirconium and the like.

In accordance with the present invention, the process for preparing the silicon-containing alumina support comprises mixing and/or kneading aluminum hydroxide or alumina, while adding a nanometer silicon compound; adding a peptizing acid and mixing all the materials to form a plastic mass; moulding the mass, drying it and calcining it, so as to provide the inventive silicon-containing alumina support.

The nanometer silicon compound can be added by one of the following methods:

(a) mixing the nanometer silicon compound with the starting material containing aluminum, i.e. aluminum hydroxide or alumina;

(b) wetting the nanometer silicon compound with deionized water and then adding the wetted compound to the starting material containing aluminum;

(c) mixing the nanometer silicon compound with a peptizing acid solution to give a mixture, and adding the mixture to the starting material containing aluminum;

(d) mixing the whole or a portion of the small-pore aluminum hydroxide, a peptizing acid solution and the nanometer silicon compound to give a peptizing agent, and mixing the peptizing agent with large-pore aluminum hydroxide; and (e) adding the nanometer silicon compound portionwise in at least two steps of steps (a), (b), (c), and (d).

The nanometer silicon compound used in the present invention is preferably nanometer silica, with a particle diameter between 6 to 100 nm. The amount of the nanometer silica added into alumina support can be determined in view of the end use of the alumina support. For example, the alumina support obtained in accordance with the process of the invention comprises 0.5 to 40%, typically 0.5 to 10%, and preferably 1.0 to 7.0%, by weight of silica.

During the preparing process of the alumina support, phosphorus can also be added, for example added as phosphorus-containing aluminum hydroxide. phosphorus-containing aluminum hydroxide can be prepared by a process comprising preparing aluminum hydroxide precipitate from a reaction between, for example, aluminum sulfate and sodium meta-aluminate or between aluminum trichloride and ammonia, by any known neutralization process; filtering the aluminum hydroxide precipitate to obtain an aluminum hydroxide cake; slurrying the aluminum hydroxide cake, and adding to the slurry a phosphorus-containing compound, while maintaining the slurry at a temperature between 30 to 90° C.; filtering, drying and calcining the dried slurry to give a phosphorus-containing aluminum hydroxide. The phosphorus-containing aluminum hydroxide usually comprises 0.3 to 3.0% by weight of phosphorus pentoxide.

In a preferred embodiment of the invention, the silicon-containing alumina support is prepared by:

mixing small-pore aluminum hydroxide powder and/or large-pore aluminum hydroxide powder to provide a mixture;

adding to the above mixture a peptizing agent which comprises a nanometer silica; or alternatively, adding an aqueous solution of an inorganic acid and a nanometer silica, and mixing all the materials to provide a plastic mass;

extruding the mass to provide a pellet; and drying the pellet at a temperature between 90 to 150° C. for 8 to 16 hours, and then calcining the dried pellet at a temperature between 450 to 650° C. for 1 to 6 hours to provide a silicon-containing alumina support of the invention.

The large-pore aluminum hydroxide used in the above process has a pore volume of 0.7 to 1.1 ml/g, an average pore size of 6.0 to 11.0 nm, and a specific surface area of 300 to 380 $m^2/g$. The small-pore aluminum hydroxide used in the above process has a pore volume of 0.2 to 0.6 ml/g, an average pore size of 2.0 to 10.0 nm, and a specific surface area of 200 to 300 $m^2/g$. The mixing ratio by weight of the large-pore aluminum hydroxide to the small-pore aluminum hydroxide in the process of the invention is 1:1 to 1:5. The ratio between the total weight of the large-pore aluminum hydroxide and the small-pore aluminum hydroxide used for mixing on the one hand and that of the large-pore aluminum hydroxide and the small-pore aluminum hydroxide used for preparing peptizing agent on the other hand is 5:1 to 25:1.

Different from the conventional process for preparing silicon-containing alumina support, the process of the invention employs a new silicon source and unique method of adding it, and thus renders silicon enriched and distributed evenly on the surface of the alumina support. As a result, the surface properties of the alumina support is modified, and favorably affects the interaction between the active metals and the alumina support in the final catalyst. Specifically, the process of the present invention has the following advantages:

(1) being simple and easy to operate, without adding extra steps, compared with the prior art process;

(2) providing an alumina support with little change of the microstructure, and thus an even distribution of the pore size of the support; hence effective control over the properties of the alumina support; increased latitude in selecting the precursors of the alumina support, e.g. pseudo-boehmite, thus reducing the cost of the process, owing to the fine particle size, high dispersity and good stability of the nanometer silica;

(3) providing an alumina support with enriched and even distribution of silicon on the surface; hence effective modification of the surface properties of the alumina support, thanks to the process wherein the nanometer silica is added after the alumina or aluminum hydroxide has already been formed;

(4) providing a support, which, when used for preparing catalysts, points to an improved interaction between the active metals and the alumina support, and thus more active centers on the surface; and (5) in a preferred embodiment wherein the alumina support containing silicon and phosphorus is prepared, overcoming the defects of the prior art that pore sizes are diffuse because of introduction of both silicon and phosphorus into the support, thanks to the process wherein the additive phosphorus is introduced before the nanometer silicon compound.

The philosophy about the addition of silicon in the process of the present invention also applies to the addition of other additives, for example titanium, boron, zirconium and phosphorus, such as in the form of nanometer titanium-containing compound, nanometer boron-containing compound, nanometer zirconium-containing compound, and nanometer phosphorus-containing compound, so as to prepare an alumina support containing one or more additives.

The silicon-containing alumina support according to the present invention can be used to make a catalyst for hydrotreating hydrocarbons, e.g. petroleum hydrocarbons, for example, a catalyst for hydrocracking or hydrorefining hydrocarbons.

The catalyst for hydrotreating hydrocarbons according to the present invention comprises, as support, the inventive silicon-containing alumina support, as active components, a metal from Group VIB and a metal from Group VIII of the Periodic Table of Elements, and optionally the additive phosphorus. In the inventive catalyst for hydrotreating hydrocarbons, the metal from Group VIB is preferably tungsten and/or molybdenum, and the metal from Group VIII is preferably nickel and/or cobalt. The final catalyst comprises, by weight, 18.0 to 28.0% of the oxide of the metal from Group VIB (for example W and/or Mo), 2.0 to 6.0% of the oxide of the metal from Group VIII (for example Ni and/or Co), and 0.3 to 7.0% of silica, with the balance being alumina support. In a preferred embodiment, the final catalyst comprises 0.5 to 8.0% of phosphorus pentoxide.

The catalyst according to the present invention has a specific surface area of 150 to 200 m$^2$/g, and a pore volume of 0.30 to 0.40 ml/g, preferably 0.32 to 0.38 ml/g, with the volume of the pores of a size between 3 to 15 nm constituting at least 90%, preferably 92 to 96%, of the total volume of the pores of the catalyst. The catalyst has an atomic ratio of silicon to aluminum on the surface of at least 0.15, and preferably 0.15–0.25. The difference between the atomic ratio of silicon to aluminum on the surface of the catalyst and the average atomic ratio of silicon to aluminum in the catalyst is 0.10 to 0.20.

The catalyst for hydrotreating hydrocarbons according to the present invention can be prepared by a process comprising impregnating the silicon-containing alumina support with a solution containing active metals, such as molybdenum and nickel, and optionally phosphorus, in accordance with a known method; drying the impregnated alumina support at a temperature between 90 to 150° C. for 1 to 5 hours; and calcining the dried alumina support at a temperature between 430 to 550° C. for 1 to 5 hours, so as to provide the final catalyst for hydrotreating hydrocarbons according to the present invention.

The catalyst for hydrotreating hydrocarbons according to the present invention displays significantly improved activity, e.g. hydro-denitrogenizing activity 20% higher than the prior art catalyst.

Analysis and Characterization

The alumina support and catalyst of the invention are measured as follows:

For the content of silica, using colorimetry;

For pore structure, using nitrogen absorption method with automatic physical absorption instrument, Model ASAP 2400 from Micromeritics Instrument Co., GA, USA;

For acidity and the distribution of acid, using NH$_3$-TG-TPD technique (absorption under vacuum and temperature-programmed desorption of ammonia);

For the distribution of the elements in the bulk of the catalyst in oxidized state, observing with JSW-6310F cold-field emitting scanning electron microscopy;

For the atomic ratio of silicon to aluminum on the surface of the support or catalyst, using the following method: the sample is measured by X-ray photoelectron spectrometry (XPS). On the other hand, the average atomic ratio of silicon to aluminum of the alumina support is calculated from the content of silica to that of alumina or catalyst. The difference between the atomic ratio on the surface and the average atomic ratio of silicon and aluminum of the alumina support or catalyst is expressed as $\Delta$Si/Al (by atomic ratio is meant the ratio between the numbers of atoms of silicon and aluminum).

The following examples are intended to further illustrate the present invention, but by no means restricts the invention.

EXAMPLE 1

Large-pore aluminum hydroxide powder 188.0 g (pore volume 0.825 ml/g, average pore size 9.4 nm, and specific surface area 350 m$^2$/g), prepared by neutralizing sodium meta-silicate with aluminum sulfate, small-pore aluminum hydroxide powder 266.0 g (pore volume 0.458 ml/g, average pore size 8.0 nm, and specific surface area 228 m$^2$/g), 4.0%, based on the total weight of the final alumina support, of nanometer silica (average particle diameter 30 nm), deionized water 75.0 g and citric acid 8 g were well mixed to provide a mixture. To the mixture was added a solution of 26.0 g 40% nitric acid and 325.0 g deionized water, and the mixture was kneaded to provide a plastic mass, which as was extruded to pellets. The pellets were dried at 110° C. for 8 hours, and then calcined at 500° C. for 4 hours, so as to give a sample 1, with properties summarized in table 1.

EXAMPLE 2

Example 1 was repeated except that the content of the nanometer silica was 6.2% (average particle diameter 15 nm) instead of 4.0%.

EXAMPLE 3

Example 1 was repeated except that the content of the nanometer silica was 2.3% (average particle diameter 45 nm) instead of 4.0%.

EXAMPLE 4

Example 1 was repeated except that the content of the nanometer silica was 8.5% and the calcining temperature was 550° C.

EXAMPLE 5

Example 1 was repeated except that the calcining temperature was 580° C.

EXAMPLE 6

Example 1 was repeated except that the nanometer silica was first mixed with the nitric acid solution and then added to large-pore and small-pore aluminum hydroxides.

EXAMPLE 7

Example 1 was repeated except that the content of the nanometer silica was 5.5%, and the silica, 10% of the small-pore aluminum hydroxide powder and nitric acid solution were mixed to form a peptizing agent, and then the peptizing agent was mixed with large-pore aluminum hydroxide and the remaining small-pore aluminum hydroxide.

EXAMPLE 8

Example 1 was repeated except that the content of the nanometer silica was 3.0%, and the silica was divided into two equal portions, one being wetted by deionized water and then added to aluminum hydroxide, the other being mixed with 5% of the small-pore aluminum hydroxide powder and nitric acid solution to form a peptizing agent and then added to aluminum hydroxide.

COMPARATIVE EXAMPLE 1

Example 1 was repeated except that 85.0 g of a silicon sol containing 20% silica was used instead of the nanometer silica, and 340 g water was used instead of 325 g.

COMPARATIVE EXAMPLE 2

Example 1 was repeated except that, instead of the large-pore aluminum hydroxide, a silicon-containing large-pore aluminum hydroxide powder, prepared by precipitation from aluminum trichloride, ammonia and sodium silicate and having a silica content of 5.2%, was used, no nanometer silica was used, and 400 g water was used.

COMPARATIVE EXAMPLE 3

Example 1 was repeated except that 130.0 g of a silicon sol was used.

EXAMPLE 9

Step 1

To a clean container was added 1200 ml deionized water. The water was heated to 65° C. To the stirred water maintained at 65° C. and a pH of 8.5 were added simultaneously an aqueous solution of sodium meta-silicate of a specific gravity of 1.35 at a rate 30 ml/minute and an aqueous solution of aluminum sulfate of a specific gravity of 1.15 at a rate of 65 ml/minute over 90 minutes.

Step 2

After the addition was terminated, the reaction system was aged at the above temperature and pH for 90 minutes. The content was filtered to give a filter cake. The cake was slurried in deionized water, washed with aqueous sodium carbonate solution and/or ammonia for 5 times, until the alumina support had a $Na^+$ content less than 0.05 mol %, a $S_4^{2-}$ content less than 1.2 mol % and a $Fe^{3+}$ content less than 0.08%.

Step 3

The cake was added to 2.5 liter of a solution of deionized water and 42 g of 85 mol % phosphoric acid, and the system was slurried at 65° C. for 40 minutes before filtered to give a cake of phosphorus-containing aluminum hydroxide.

Step 4

The cake from step 3 was dried at 120° C. for 8 hours, and could be used in the next step without further treating.

Step 5

142 g of the phosphorus-containing aluminum hydroxide from step 4, 252 g of the small-pore aluminum hydroxide as above, 7.5 g of a nanometer silica (average particle diameter 30 nm) and 90 g of deionized water were well mixed to provide a mixture. To the mixture was added a solution consisting of 24 g of 40% nitric acid solution and 340 g of deionized water. The mixture was then kneaded to form a plastic mass and moulded to pellets. The pellets were dried at 120° C. for 8 hours and calcined at 500° C. for 4 hours to provided an alumina support, with properties as shown in table 2.

EXAMPLE 10

Step 1

The same as steps 1 and 2 of example 9.

Step 2

The same as step 3 of example 9 except that 56 g of 85 mol % phosphoric acid was used instead of 42.0 g 85 mol % phosphoric acid.

Step 3

The same as steps 4–5 of example 9.

The product had properties as shown in table 2.

EXAMPLE 11

Step 1

The same as steps 1 and 2 of example 9.

Step 2

The same as step 3 of example 9 except that 75 g of 85 mol % phosphoric acid was used instead of 42.0 g 85 mol % phosphoric acid.

Step 3

The same as steps 4–5 of example 9.

The product had properties as shown in table 2.

EXAMPLE 12

Step 1

The same as steps 1–4 of example 9.

Step 2

The same as step 5 of example 9 except that the pellets were calcined at 550° C. for 4 hours.

The product had properties as shown in table 2.

EXAMPLE 13

Step 1

The same as steps 1–4 of example 9.

Step 2

The same as step 5 of example 9 except that the pellets were calcined at 600° C. for 3 hours.

The product had properties as shown in table 2.

EXAMPLE 14

Example 9 was repeated except that 13 g of a nanometer silica (average particle diameter 20 nm) was used, and was mixed with nitric acid solution; the mixture was added to large-pore and small-pore aluminum hydroxides.

EXAMPLE 15

Example 9 was repeated except that 20 g of a nanometer silica (average particle diameter 45 nm) was used, and was mixed with 10% of the small-pore aluminum hydroxide and nitric acid solution to form a peptizing agent; the peptizing agent was added to large-pore and small-pore aluminum hydroxides.

EXAMPLE 16

Example 9 was repeated except that 25 g of a nanometer silica was used, and the nanometer silica was divided into two equal portions, one being wetted by deionized water and then added to aluminum hydroxide, the other being mixed with 5% of the small-pore aluminum hydroxide powder and nitric acid solution to form a peptizing agent and then added to aluminum hydroxide.

COMPARATIVE EXAMPLE 4

Example 9 was repeated except that, in step 5, 95 g of 20% silicon sol was used instead of nanometer silica, 390 g of deionized water was used, and additive phosphorus was introduced by co-precipitation (similar to the method of U.S. Pat. No. 4,758,544).

EXAMPLE 17

100 g alumina from example 1, 2, 3, 7, 9, 12, 14, 15, and comparative example 2 and 4 respectively, were impregnated with 250 ml of a solution containing 38 g/100 ml of $MoO_3$, 7.2 g/100 ml of NiO, and 3.0 g/100 ml of P (for the phosphorus-containing alumina support from example 9, 12, 14, 15 and comparative example 4, the content of P in the impregnating solution was 2.0 g/100 ml) for 2.0 hours, dried at 110° C. for 4 hours and calcined at 500° C. for 4 hours to provide hydrotreating catalysts C1–C10. The compositions and properties of the catalysts were summarized in table 3. The distributions of the elements in the bulk of the catalysts in oxidized state were observed with electron microscopy and the results were summarized in table 4.

From table 3, it can be seen that, when the total content of silica in the catalyst was 1.7 to 5.0%, the ratio of silicon to aluminum on the surface was high, and was typically 0.16 to 0.20. In other words, silicon was enriched on the surface of the catalyst, with a difference between the atomic ratio of silicon to aluminum on the surface and the average atomic ratio of silicon to aluminum being at least 0.10, higher than that of the prior art. In addition, from the electron microscopy observations of the element distribution in the bulk of the catalysts in oxidized state in table 4, it can be seen that, diametrically, the pellets of the catalyst had a small gradient of the elements from inside to outside, a fact that the nanometer silica introduced in accordance with the invention facilitated the even distribution of the elements and even surface properties.

EXAMPLE 18

The catalysts obtained in example 17 were evaluated.

Prior to evaluation, the catalysts were pre-sulphurized with lamp oil containing 1.8% of carbon disulfide under a hydrogen partial pressure of 13.7 MPa, at a volume space velocity of 1.2 $h^{-1}$ and a hydrogen/oil volume ratio of 1200:1. The pre-sulphurization proceeded at 230° C. for 8 hours and at 360° C. for 4 hours.

Following pre-sulphurization, the catalysts were put into use for treating VGO oil from Iran (containing 1.1% of sulfur, 0.12% of nitrogen and 42.8% of aromatics) under reaction conditions including a hydrogen partial pressure of 14.7 MPa, a volume space velocity of 1.0 $h^{-1}$, a hydrogen/oil volume ratio of 1000:1. The results were summarized in table 5.

TABLE 1

Physico-chemical properties of the support of examples 1–8 and comparative examples 1–3

| Example | $PV^1$, ml/g | $SSA^2$ $m^2/g$ | $APS^3$ nm | ROP-3–15 $nm^4$, % | $TA^5$, mmol/g | $TC\text{-}SiO_2^6$, % | $A\text{-}Si/Al^7$ | $Sur\text{-}Si/Al^8$ | $\Delta Si/Al^9$ |
|---|---|---|---|---|---|---|---|---|---|
| 1 | 0.61 | 302 | 7.9 | 90.7 | 0.67 | 4.00 | 0.0354 | 0.164 | 0.129 |
| 2 | 0.63 | 312 | 8.1 | 90.0 | 0.77 | 6.20 | 0.0562 | 0.190 | 0.134 |
| 3 | 0.61 | 300 | 7.8 | 91.5 | 0.65 | 2.20 | 0.0191 | 0.158 | 0.139 |
| 4 | 0.63 | 290 | 8.3 | 89.6 | 0.78 | 8.52 | 0.0792 | 0.281 | 0.202 |
| 5 | 0.65 | 280 | 8.5 | 89.0 | 0.70 | 4.07 | 0.0361 | 0.160 | 0.124 |
| 6 | 0.61 | 308 | 7.8 | 91.2 | 0.69 | 4.10 | 0.0363 | 0.169 | 0.133 |
| 7 | 0.63 | 310 | 7.9 | 92.0 | 0.75 | 5.40 | 0.0485 | 0.186 | 0.138 |
| 8 | 0.62 | 303 | 8.0 | 91.7 | 0.65 | 3.07 | 0.0269 | 0.160 | 0.133 |
| $1c^{10}$ | 0.64 | 280 | 8.4 | 85.9 | 0.55 | 5.50 | 0.0495 | 0.108 | 0.059 |
| 2c | 0.65 | 285 | 8.5 | 86.1 | 0.53 | 2.51 | 0.0219 | 0.087 | 0.065 |
| 3c | 0.66 | 289 | 8.9 | 84.5 | 0.58 | 8.53 | 0.0792 | 0.142 | 0.063 |

Note:
[1]PV: pore volume
[2]SSA: specific surface area
[3]APS: average pore size
[4]ROP 3–15 nm: the ratio of the volume of the pores of a size between 3–15 nm to the volume of the total pores
[5]TA: total acidity
[6]TC-$SiO_2$: total amount of $SiO_2$
[7]A-Si/Al: average atomic ratio of silicon to aluminum
[8]Sur-Si/Al: the atomic ratio of silicon to aluminum on the surface
[9]$\Delta$Si/Al: the difference between the atomic ratio of silicon to aluminum on the surface and the average atomic ratio of silicon to aluminum
[10]1C: comparative example 1 (similar to other comparative examples)

TABLE 2

Physico-chemical properties of the support of examples 9–16 and comparative example 4

| example | $P_2O_5$ % | TPD-$NH_3$ (TA) Mmol/g | ROP- 3–15 nm, % | PV, ml/g | SSA $m^2/g$ | APS nm | TC-$SiO_2$ % | A-Si/Al | Sur- Si/Al | ΔSi/Al |
|---|---|---|---|---|---|---|---|---|---|---|
| 9  | 1.00 | 0.67 | 95.6 | 0.597 | 320 | 7.9 | 2.19 | 0.0190 | 0.169 | 0.150 |
| 10 | 1.32 | 0.65 | 95.7 | 0.613 | 325 | 8.0 | 2.17 | 0.0188 | 0.170 | 0.151 |
| 11 | 1.74 | 0.62 | 94.9 | 0.625 | 318 | 8.1 | 2.19 | 0.0190 | 0.168 | 0.149 |
| 12 | 1.10 | 0.64 | 95.0 | 0.637 | 315 | 8.2 | 2.18 | 0.0189 | 0.168 | 0.149 |
| 13 | 1.07 | 0.66 | 94.0 | 0.645 | 305 | 8.4 | 2.20 | 0.0191 | 0.167 | 0.148 |
| 14 | 1.09 | 0.70 | 95.8 | 0.611 | 339 | 7.8 | 4.08 | 0.0362 | 0.165 | 0.129 |
| 15 | 1.08 | 0.73 | 95.4 | 0.619 | 337 | 7.9 | 5.88 | 0.0531 | 0.205 | 0.152 |
| 16 | 1.11 | 0.75 | 94.9 | 0.624 | 334 | 8.0 | 7.21 | 0.0660 | 0.213 | 0.147 |
| 4C | 1.61 | 0.52 | 81.2 | 0.650 | 290 | 8.6 | 5.90 | 0.0542 | 0.125 | 0.071 |

TABLE 3

The compositions and properties of the catalysts of example 17

| catalyst | Support (Example No.) | $SiO_2$ % | $P_2O_5$ % | $MoO_3$ % | NiO % | $Al_2O_3$ % |
|---|---|---|---|---|---|---|
| C1  | 1  | 3.1 | 5.2 | 25 | 4 | balance |
| C2  | 2  | 4.8 | 5.2 | 25 | 4 | balance |
| C3  | 3  | 1.7 | 5.2 | 25 | 4 | balance |
| C4  | 7  | 4.2 | 5.2 | 25 | 4 | balance |
| C5  | 9  | 1.7 | 5.5 | 25 | 4 | balance |
| C6  | 12 | 1.7 | 5.5 | 25 | 4 | balance |
| C7  | 14 | 3.2 | 5.5 | 25 | 4 | balance |
| C8  | 15 | 4.5 | 5.5 | 25 | 4 | balance |
| C9  | 2c | 1.9 | 5.2 | 25 | 4 | balance |
| C10 | 4c | 4.5 | 5.5 | 25 | 4 | balance |

| Catalysts | PV ml/g | SSA $m^2/g$ | ROP- 3~15 nm, % | TPD-NH3- (TA) mmol/g | A-Si/Al | Sur- Si/Al | ΔSi/Al |
|---|---|---|---|---|---|---|---|
| C1  | 0.35 | 164 | 92.7 | 0.64 | 0.0416 | 0.172 | 0.130 |
| C2  | 0.36 | 157 | 92.3 | 0.74 | 0.0661 | 0.196 | 0.130 |
| C3  | 0.37 | 155 | 96.1 | 0.65 | 0.0223 | 0.168 | 0.146 |
| C4  | 0.34 | 168 | 94.7 | 0.73 | 0.0587 | 0.186 | 0.127 |
| C5  | 0.31 | 182 | 96.7 | 0.75 | 0.0223 | 0.169 | 0.147 |
| C6  | 0.33 | 178 | 97.0 | 0.73 | 0.0223 | 0.168 | 0.146 |
| C7  | 0.32 | 185 | 96.2 | 0.75 | 0.0416 | 0.166 | 0.124 |
| C8  | 0.30 | 187 | 95.6 | 0.77 | 0.0588 | 0.206 | 0.147 |
| C9  | 0.38 | 167 | 86.4 | 0.56 | 0.0225 | 0.087 | 0.065 |
| C10 | 0.39 | 163 | 81.7 | 0.54 | 0.0588 | 0.125 | 0.066 |

TABLE 5

Evaluation of the catalysts

| catalyst | Reaction temperature, ° C. | Sulfur content in the product oil, μg/g | Nitrogen content in the product oil, μg/g |
|---|---|---|---|
| C1  | 370     | 57 | 9.7 |
| C2  | 370 + 2 | 43 | 6.5 |
| C3  | 370 + 1 | 65 | 8.2 |
| C4  | 370 + 1 | 55 | 6.0 |
| C5  | 370 + 1 | 71 | 7.4 |
| C6  | 370 + 2 | 65 | 7.7 |
| C7  | 370     | 45 | 7.3 |
| C8  | 370 + 1 | 45 | 5.5 |
| C9  | 370 + 5 | 97 | 9.5 |
| C10 | 370 + 6 | 82 | 9.0 |

EXAMPLES 19 AND 20

Example 1 was repeated except that the amount of the nanometer silica was increased so that the silica contents in the silicon-containing alumina support were 10% and 15%. The properties of the alumina supports were summarized in table 6.

COMPARATIVE EXAMPLES 5 AND 6

Comparative example 1 was repeated except that the amount of silicon sol was increased so that the silica contents in the silicon-containing alumina support were 10% and 15%. The properties of the alumina supports were summarized in table 6.

TABLE 4

The element distributions in the bulk of the catalysts in oxidized state as observed with electron microscopy*

| | C3 | | | C4 | | | C7 | | | C9 | | | C10 | | |
|---|---|---|---|---|---|---|---|---|---|---|---|---|---|---|---|
| Elements | edge | middle | center | edge | middle | center | edge | middle | center | edge | middle | center | edge | middle | center |
| Si | 1.13 | 1.21 | 1.09 | 1.78 | 1.87 | 1.69 | 1.47 | 1.55 | 1.39 | 0.77 | 0.98 | 0.69 | 1.24 | 1.31 | 1.09 |
| Ni | 2.27 | 2.05 | 2.18 | 2.33 | 2.12 | 2.21 | 2.20 | 2.09 | 2.11 | 2.09 | 3.23 | 2.71 | 1.89 | 3.01 | 2.51 |
| Mo | 14.2 | 13.1 | 14.3 | 13.8 | 12.9 | 14.5 | 15.8 | 14.5 | 16.2 | 14.3 | 9.8  | 11.0 | 15.9 | 10.5 | 12.1 |

*The content of the element in oxidized state was defined as the percentage of the mass of the element at a micro-area in the cross-section of the bulk of the catalyst to the total mass of the element in the catalyst in oxidized state.

TABLE 6

Physico-chemical properties of the alumina support of examples 19–20 and comparative examples 5–6

| Example | PV, ml/g | SSA, m²/g | APS, nm | ROP-3–15 nm, % | TA, mmol/g | TC-SiO₂, % | A-Si/Al | Sur-Si/Al | ΔSi/Al |
|---|---|---|---|---|---|---|---|---|---|
| 19 | 0.615 | 316 | 8.0 | 91.1 | 0.81 | 9.62 | 0.090 | 0.294 | 0.204 |
| 20 | 0.623 | 323 | 8.1 | 89.5 | 0.84 | 14.60 | 0.145 | 0.372 | 0.227 |
| 5c | 0.666 | 290 | 8.6 | 79.2 | 0.62 | 9.87 | 0.093 | 0.182 | 0.089 |
| 6c | 0.691 | 275 | 8.9 | 75.3 | 0.64 | 14.79 | 0.148 | 0.283 | 0.135 |

The invention is not limited by the embodiments described above which are presented as examples only but can be modified in various ways within the scope of protection defined by the appended patent claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A silicon-containing alumina support comprising 0.5 to 10.0 weight percent of silica, wherein the difference between the atomic ratio of silicon to aluminum on the surface of alumina support and the average atomic ratio of silicon to aluminum of the alumina support is at least 0.10.

2. The alumina support of claim 1 wherein the difference between the atomic ratio of silicon to aluminum on the surface of the alumina support and the average atomic ratio of silicon to aluminum of the alumina support is 0.10 to 0.25.

3. The alumina support of claim 1 wherein the difference between the atomic ratio of silicon to aluminum on the surface of alumina support and the average atomic ratio of silicon to aluminum of the alumina support is 0.12 to 0.20.

4. The alumina support of claim 1 wherein the alumina support comprises 1.0 to 7.0 weight percent of silica.

5. The alumina support of claim 1 wherein the atomic ratio of silicon to aluminum on the surface of the alumina support is at least 0.15.

6. The alumina support of claim 5 wherein the atomic ratio of silicon to aluminum on the surface of the alumina support is 0.15 to 0.30.

7. The alumina support of claim 1 wherein the alumina support has a specific surface area of 270–320 m²/g, and a pore volume of 0.55 to 0.68 ml/g, with the volume of the pores of a size between 3 to 15 nm constituting at least 90% of the total volume of the pores of the alumina support.

8. The alumina support of claim 7 wherein the volume of the pores of a size between 3 to 15 nm constitutes 90 to 96% of the total volume of the pores of the alumina support.

9. A catalyst for hydrotreating hydrocarbons comprising the silicon-containing alumina support of claim 1, and a metal from Group VIB and a metal from Group VIII of the Periodic Table of Elements as active components.

10. The catalyst of claim 9 wherein the catalyst comprises 0.3 to 7.0 weight percent of silica, and the catalyst has an atomic ratio of silicon to aluminum on the surface of at least 0.15, a pore volume of 0.30 to 0.40 ml/g, with the volume of the pores of a size between 3 to 15 nm constituting at least 90% of the total volume of the pores of the catalyst.

11. The catalyst of claim 10 wherein the catalyst has an atomic ratio of silicon to aluminum on the surface of 0.15–0.25.

12. The catalyst of claim 10 wherein the difference between the atomic ratio of silicon to aluminum on the surface of the catalyst and the average atomic ratio of silicon to aluminum of the catalyst is 0.10 to 0.20.

13. The catalyst of claim 9 wherein the catalyst further comprises phosphorus.

14. The catalyst of claim 9 wherein the metal from Group VIB is 18.0 to 28.0 weight percent of the oxide of tungsten and/or molybdenum; the metal from Group VIII is 2.0 to 6.0 weight percent of the oxide of nickel and/or cobalt; and the catalyst comprises 0.5 to 8.0 weight percent of phosphorus pentoxide.

15. The catalyst of claim 9 wherein the catalyst has a specific surface area of 150 to 200 m²/g, a pore volume of 0.32 to 0.38 ml/g, with the volume of the pores of a size between 3 to 15 nm constituting at least 92 to 96% of the total volume of pores of the catalyst.

* * * * *

UNITED STATES PATENT AND TRADEMARK OFFICE
CERTIFICATE OF CORRECTION

PATENT NO. : 6,875,722 B2 Page 1 of 1
APPLICATION NO. : 10/682221
DATED : April 5, 2005
INVENTOR(S) : Dengling Wei It is certified that error appears in the above-identified patent and that said Letters Patent is hereby corrected as shown below:

Please replace the Assignee information listed on the cover page with the following:

--(73) Assignee: China Petroleum & Chemical Corporation, Beijing (CN);
                     Fushun Research Institute of Petroleum and Petrochemicals
                     Sinopec Corp., Fushun (CN)--

Signed and Sealed this

Fifth Day of September, 2006

JON W. DUDAS
*Director of the United States Patent and Trademark Office*